March 23, 1937. E. E. HEWITT 2,074,746
VALVE
Filed May 5, 1934

INVENTOR
ELLIS E. HEWITT.
BY Wm. A. Cady
ATTORNEY

Patented Mar. 23, 1937

2,074,746

UNITED STATES PATENT OFFICE 2,074,746

VALVE

Ellis E. Hewitt, Edgewood, Pa., assignor to The Westinghouse Air Brake Company, Wilmerding, Pa., a corporation of Pennsylvania Application May 5, 1934, Serial No. 724,080

1 Claim. (Cl. 251—160)

This invention relates to valves and more particularly to that type of compressible gasket which is of annular form and which is adapted to be clamped between a valve guide member and a clamping member to serve as a valve for engagement with a valve seat rib.

In constructing a valve member of the type in which a compressible gasket is to serve as a valve it is the usual practice to provide the guide portion of the valve member with a gasket clamping face and with a central annular sleeve which extends outwardly from the clamping face and to make the central opening in the gasket of such diameter so that when the gasket is pressed into contact with the clamping face of the guide portion, substantially the entire area of the inner edge surface of the gasket snugly engages the outer surface of the sleeve. This snug fit is provided for two purposes; first, to hold the gasket in place on the sleeve preparatory to its being finally clamped in place, and second, to automatically center the gasket on the guide portion. It has been found that since substantially the entire area of the inner surface of the gasket snugly engages the sleeve of the guide portion, the displacement of the material forming the gasket in finally clamping the gasket in place causes the seating portion of the gasket to buckle or distort. This is of course very objectionable in that it prevents the gasket from seating evenly on the usual valve seat rib with which it is adapted to engage, with the result that fluid under pressure may leak past the gasket and seat rib.

The principal object of the invention is to provide an improved gasket of the above mentioned type which is so formed that it will hold itself properly positioned preparatory to its being finally clamped in place and yet will not be caused to buckle and thereby distort the seating face when it is being finally clamped in place.

Figure 1:
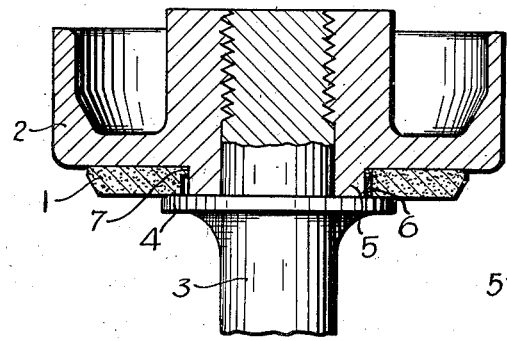
Figure 2:
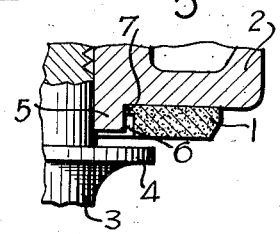
Figure 3:
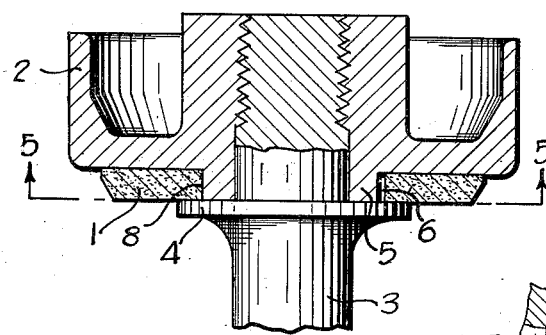
Figure 4:
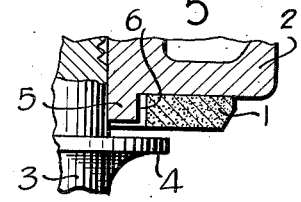
Figure 5:
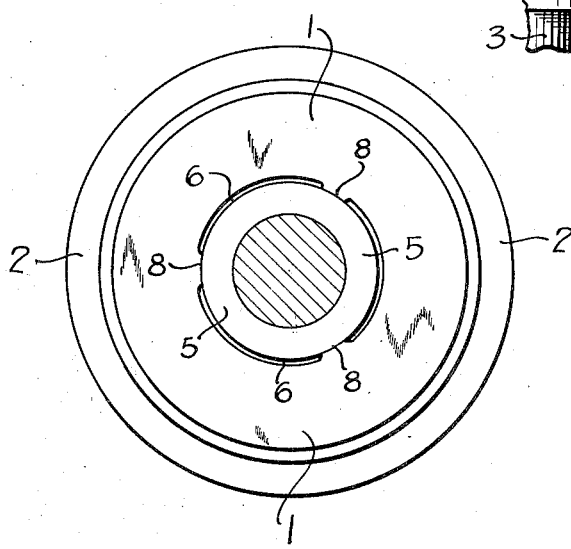

In the accompanying drawing, Fig. 1 is a view, mainly in cross section, of a valve construction embodying the improved gasket, the gasket being shown clamped in place; Fig. 2 is a fragmentary sectional view illustrating the gasket before it is clamped in place; Figs. 3 and 4 are views similar to Figs. 1 and 2 respectively illustrating another form of gasket, and Fig. 5 is a sectional view taken on the line 5—5 of Fig. 3.

In the drawing, the gasket 1 is illustrated as constituting a part of a valve assembly which comprises a valve guide member 2 and a valve stem 3 having screw-threaded connection with the guide member and being provided with a collar 4 for clamping the gasket 1 to the guide member.

As shown in Figs. 1 and 2 the gasket 1 is of annular form and is adapted to fit over an annular sleeve 5 which is preferably a part of the guide member and which extends outwardly from the gasket engaging face of the member.

The inner edge portion of the gasket for a portion of its thickness snugly engages the outer peripheral surface 6 of the sleeve 5, and for the remainder of its thickness is out of contact with the surface 6, thus a clearance space is provided which is adapted to accommodate the displaced material of the gasket when the collar is moved into clamping relation with the gasket.

It will be understood from an inspection of Fig. 2 that when the gasket 1 is slipped over the sleeve 5, a relatively shallow portion or bead 7 of the inner edge portion of the gasket snugly engages the surface 6 of the sleeve 5 and by reason of such engagement the gasket is properly centered and held in place on the guide member. It will be noted that before the gasket is clamped in place the outer face thereof is beyond the end of the sleeve 5, so that as the stem is screwed into the guide member the collar 4 engages and compresses the inner edge portion of the gasket and compresses it until such time as the collar is brought into close engagement with the end of the sleeve 5.

The gasket material which has been displaced during the time the gasket is being compressed is accommodated by the space provided between the inner edge of the gasket and the surface 6 of the sleeve 5, and due to this the hereinbefore mentioned objectionable bucking action, which distorts the seating face of the gasket, is effectively prevented.

In Figs. 3, 4 and 5 another form of the improved gasket is illustrated in which spaced portions 8 thereof in the form of lugs engage the sleeve 5 and in which, between said spaced portions, there is a clearance space provided between the gasket and surface 6 of the sleeve 5 to accommodate the displaced gasket material when the gasket is clamped in place.

In practice only a slight compression of the gasket is necessary to insure its being tightly held in place, so that the thickness of the gasket need be only slightly greater than the length of the sleeve. Since this difference in the thickness of the gasket and the length of the sleeve would not be readily seen in the drawing, the thickness of the gasket has been exaggerated in both Figs. 2 and 4 to more clearly illustrate the features of the invention.

Although the invention is shown and described as being embodied in a gasket constituting a part of a valve construction, it is to be understood that it may be embodied in other types of gaskets.

While two illustrative embodiments of the invention have been described in detail, it is not my intention to limit its scope to these embodiments or otherwise than by the terms of the appended claim.

Having now described my invention, what I claim as new and desire to secure by Letters Patent, is:

The combination with a member having a clamping face, a projection extending outwardly from the clamping face, a compressible gasket mounted on said projection and clamped against said clamping face, and a member operative to clamp said gasket to the first mentioned member, said gasket having an opening for the reception of said projection, portions of the opening defining edge of the gasket being in the form of spaced lugs which engage the peripheral surface of the projection and the remaining portions of said edge being spaced away from said peripheral surface to provide a space for the accommodation of the gasket material which is displaced as the gasket is clamped to the first mentioned member.

ELLIS E. HEWITT.